(12) United States Patent
Wipperfuerth

(10) Patent No.: US 9,680,146 B2
(45) Date of Patent: Jun. 13, 2017

(54) APPARATUS AND METHOD FOR FILLING A CELL OF A RECHARGEABLE BATTERY WITH ELECTROLYTE LIQUID

(71) Applicant: CMWTEC technologie GmbH, Runkel-Ennerich (DE)

(72) Inventor: Walter Wipperfuerth, Wiesbaden (DE)

(73) Assignee: CMWTEC technologie GmbH, Runkel-Ennerich (DE)

( * ) Notice: Subject to any disclaimer, the term of this patent is extended or adjusted under 35 U.S.C. 154(b) by 12 days.

(21) Appl. No.: 14/763,352

(22) PCT Filed: Jan. 22, 2014

(86) PCT No.: PCT/EP2014/051234
§ 371 (c)(1),
(2) Date: Jul. 24, 2015

(87) PCT Pub. No.: WO2014/118057
PCT Pub. Date: Aug. 7, 2014

(65) Prior Publication Data
US 2015/0364746 A1    Dec. 17, 2015

(30) Foreign Application Priority Data
Jan. 30, 2013    (DE) .................. 10 2013 001 576

(51) Int. Cl.
*H01M 2/36* (2006.01)
*H01M 10/06* (2006.01)

(52) U.S. Cl.
CPC ........... *H01M 2/362* (2013.01); *H01M 2/365* (2013.01); *H01M 10/06* (2013.01); *H01M 2220/20* (2013.01); *Y02E 60/126* (2013.01)

(58) Field of Classification Search
CPC ........ H01M 2/36; H01M 2/361; H01M 2/362; H01M 2/365; H01M 10/06; H01M 2220/20

(Continued)

(56) References Cited

U.S. PATENT DOCUMENTS 3,912,541 A * 10/1975 Britz ................. H01M 2/36
                                                           429/118
4,061,163 A * 12/1977 Decker ................. H01M 6/14
                                                             141/4

(Continued)

FOREIGN PATENT DOCUMENTS

CN        2938426 Y        8/2007
DE       29915950 U1     12/1999

(Continued)

OTHER PUBLICATIONS

International Search Report issued Mar. 27, 2014 in Int'l Application No. PCT/EP2014/051234.

*Primary Examiner* — Nicolas A Arnett
(74) *Attorney, Agent, or Firm* — Rogowski Law LLC

(57) ABSTRACT

A device (1) and method for filling at least one cell (2) of a rechargeable battery (3) with electrolyte liquid (30) has an evacuatable sealing container (20) to accommodate a filling apparatus (10) and the rechargeable battery (3). A feed means (11) passes through the container wall (21) to supply the filling apparatus (10) with electrolyte liquid (30). The filling apparatus (10) has at least one reservoir (13) for electrolyte liquid (30) that is in a state of pressure balance with the interior of the sealing container (20) when filled above the level (31) of the electrolyte liquid. Via at least one outlet (12) located below the level (31) of the electrolyte liquid, the reservoir (13) can be flow-connected to a filling opening (4) of the cell (2) that is to be filled, while the (Continued)

interior (5) of the cell (2) is sealed so as to be pressure-tight vis-à-vis the interior (22) of the sealing container (20).

15 Claims, 3 Drawing Sheets

(58) Field of Classification Search
USPC .............................. 141/1.1, 4–5, 7–8, 32, 65
See application file for complete search history.

(56) References Cited

U.S. PATENT DOCUMENTS

| | | | | |
|---|---|---|---|---|
| 4,350,185 A | * | 9/1982 | Quist | H01M 2/36 137/205 |
| 5,002,100 A | * | 3/1991 | Frederick | H01M 10/484 141/198 |
| 6,497,976 B1 | * | 12/2002 | Morizane | H01M 2/361 141/59 |
| 6,588,460 B1 | * | 7/2003 | Wipperfurth | H01M 2/362 141/1.1 |
| 6,588,461 B2 | * | 7/2003 | Morizane | H01M 2/361 141/61 |
| 6,706,440 B1 | * | 3/2004 | Takimoto | H01M 2/361 141/241 |
| 8,047,241 B2 | * | 11/2011 | Reschke | H01M 2/361 137/260 |
| 8,910,671 B2 | * | 12/2014 | Yamaura | H01M 10/0404 141/1.1 |
| 2003/0064280 A1 | * | 4/2003 | Morizane | H01M 2/361 429/80 |
| 2009/0242073 A1 | * | 10/2009 | Reschke | H01M 2/361 141/7 |

FOREIGN PATENT DOCUMENTS

| | | |
|---|---|---|
| JP | H0799050 A | 4/1995 |
| KR | 20110032848 A | 3/2011 |
| WO | WO 2011/080918 * 7/2011 | ............. H01M 2/36 |

\* cited by examiner

APPARATUS AND METHOD FOR FILLING A CELL OF A RECHARGEABLE BATTERY WITH ELECTROLYTE LIQUID

CROSS-REFERENCE TO RELATED APPLICATIONS

This application is a national stage application (under 35 USC §371) of PCT/EP2014/051234, filed Jan. 22, 2014, which claims benefit of German application No. 10 2013 001 576.6, filed Jan. 30, 2013.

BACKGROUND OF THE INVENTION

Technical Field and State of the Art

The present invention relates to a device for filling at least one cell of a rechargeable battery with electrolyte liquid, said device comprising a filling apparatus, an evacuatable sealing container to accommodate the filling apparatus and the rechargeable battery, and comprising a feed means that passes through the container wall and that serves to supply the filling apparatus with electrolyte liquid.

Moreover, the invention relates to a method for filling at least one cell of a rechargeable battery with electrolyte liquid in the interior of a sealing container, especially to a method for filling by means of a device of the above-mentioned type.

The basic unit of rechargeable batteries is a galvanic cell consisting of a set of electrodes that is arranged in an electrolyte liquid bath. In this context, a rechargeable battery, depending on the design and application purpose, can have several such cells which, for example, in a rechargeable battery for a motor vehicle, are arranged next to each other inside a housing. In order to fill the cells with electrolyte liquid, in the case of a series of rechargeable batteries, it is necessary to evacuate the cell prior to the filling procedure, on the one hand, in order to prevent the formation of air pockets or air bubbles, especially when gel-like electrolytes are being used. On the other hand, the evacuation of the cell prior to the filling procedure serves to reduce the filling time which, for technical reasons, should be as short as possible, particularly in the case of gel-like electrolytes. Accordingly, several different prior-art filling devices and filling methods of the above-mentioned type are disclosed in the state of the art.

European patent specification EP 1 142 042 B1 discloses a device for filling at least one battery cell wherein the battery is accommodated inside a recipient that can be evacuated by means of a vacuum pump. Moreover, the device has a filling apparatus that is likewise accommodated inside the recipient and that serves to introduce the electrolyte into a filling opening of the cell. In this process, the filling apparatus is supplied with electrolyte liquid via a feed line that enters the recipient in a vacuum-tight manner. Moreover, on one side, the feed line has a filling head with an outlet connection piece which, in the filling position, is engaged or inserted with play into the filling opening of the cell. Due to the play that exists between the inserted outlet connection piece and the filling opening, the cell can easily be evacuated prior to the filling procedure by also evacuating the entire recipient so that it can subsequently be filled with electrolyte fluid via the filling apparatus. Even though the evacuation of the cell prior to the filling procedure using such a device can prevent the formation of air pockets or air bubbles in the electrolyte, the filling times that can be achieved with such an approach are often still unsatisfactorily long, especially when gel-like electrolytes are being filled, since their viscosity causes them to be highly viscous.

Furthermore, U.S. Pat. No. 4,061,163 discloses a filling device having an evacuatable chamber, in which one or more lithium cells can be arranged in order to be filled with electrolyte liquid. In this context, first of all, the lithium cells with their single filling opening are positioned on a rack inside the chamber so as to be facing downwards. Subsequently, the chamber is evacuated in order to remove water and water vapor from the cells. Then the negative pressure in the chamber is slightly increased so that it is above the boiling point of the electrolyte that is to be filled. After that, the recipient is first filled with electrolyte liquid, so that the inlet openings of the lithium cells are submerged into the electrolyte. After the bottom section of the chamber has been filled, the negative pressure in the chamber is increased further, first to atmospheric pressure and then to a level that is above atmospheric pressure, as a result of which the electrolyte liquid can enter the lithium cell through the inlet opening. A drawback of this device, however, is the fact that parts of the outside of the cell or of the outside of the battery come into contact with the chemically aggressive electrolyte liquid when they are immersed into the electrolyte bath, so that, after the filling procedure, the cell or the battery has to be thoroughly cleaned, which is time-consuming and technically demanding.

Before this backdrop, it is the objective of the present invention to improve a device as well as a method of the above-mentioned type for filling a cell of a rechargeable battery with electrolyte liquid so that the evacuation and especially the filling of the cell can be carried out in the shortest possible time while also avoiding any contamination of the outside of the rechargeable battery with the electrolyte. At the same time, the electrolyte liquid should penetrate the set of electrodes in the cell to the greatest saturation extent possible.

SUMMARY OF THE INVENTION

According to a first embodiment of the invention, the device comprises a filling apparatus, an evacuatable sealing container to accommodate the filling apparatus and the rechargeable battery, and further comprises a feed means that passes through the container wall and that serves to supply the filling device with electrolyte liquid. The device is characterized in that the filling apparatus has at least one reservoir which can be filled with electrolyte liquid, which is in a state of pressure balance with the interior of the sealing container when filled above the level of the electrolyte liquid and which, via at least one outlet located below the level of the electrolyte liquid, can be flow-connected to a filling opening of the cell that is to be filled, while the interior of the cell is sealed so as to be pressure-tight vis-à-vis the interior of the sealing container.

Thanks to such an outlet, by means of which the interior of the sealing container can be flow-connected to the interior of the cell that is to be filled so as to be pressure-tight vis-à-vis the interior of the sealing container, it is achieved in the manner according to the invention that a pressure difference can be built up between the interior of the cell and the interior of the sealing container, especially the space above the level of the electrolyte liquid, in order to use pressure to convey the electrolyte liquid out of the reservoir and into the interior of the cell.

For this purpose, first of all, the interior of the cell that is to be filled as well as the interior of the recipient are evacuated, preferably using a vacuum pump, so that the evacuation of the cell takes place automatically in that the rechargeable battery with opened filling openings is accommodated in the interior of the vacuum-tight sealing container. During the evacuation, the filling apparatus, which is likewise accommodated in the sealing container, can already be flow-connected pressure-tight via the at least one outlet to the interior of the cell that is to be filled, since the reservoir should still be unfilled during the evacuation procedure. In this case, the interior of the cell is vented via the outlet and via the reservoir that is in a state of pressure balance with the interior of the sealing container. On the other hand, as an alternative, it is also possible for the reservoir to only be flow-connected pressure-tight to the interior of the cell that is to be filled once the evacuation has been carried out. After the evacuation and after the flow-connection has been established, the reservoir is filled with electrolyte liquid, preferably by means of the feed means of the filling apparatus. Subsequently or else already during the filling procedure, the pressure in the interior of the sealing container is increased, for example, in that the sealing container is slowly vented. In this process, the electrolyte liquid introduced into the reservoir forms a pressure barrier by means of which—while the pressure is being increased in the sealing container—a pressure difference can be built up between the interior of the cell that is to be filled and the reservoir space that is above the level of the electrolyte liquid and that is in a state of pressure balance with the interior of the sealing container.

Advantageously, this pressure difference causes the filling procedure to transpire considerably faster than, for instance, by merely allowing the electrolyte to flow in due to the force of gravity. Moreover, exerting pressure onto the level of the electrolyte liquid causes the electrolyte to very effectively saturate the set of electrodes of the cell that is to be filled. This is particularly relevant when the interior of the cell is provided with a nonwoven material, as is the case with modern rechargeable batteries for motor vehicles. The electrolyte liquid is supposed to soak into the non-woven with the greatest saturation possible until it is completely saturated and does not contain any air pockets. Only in this manner can flawless functioning of the rechargeable battery be ensured. The thorough penetration of the electrolyte into the interior of the cell can be even accelerated or improved if the pressure in the interior of the recipient is increased to atmospheric pressure and beyond that to a level that is above atmospheric pressure. The greater the pressure difference between the interior of the cell and the interior of the sealing container, the faster the filling procedure takes place and thus the greater the amount of electrolyte liquid that can be introduced.

As a result of the pressure-tight sealing of the interior of the cell vis-à-vis the interior of the sealing container by means of the outlet, it is ruled out that the outside of the cell or of the rechargeable battery can come into contact with electrolyte liquid in any way whatsoever. This eliminates the need for the laborious task of cleaning electrolyte liquid adhering to the outside of the rechargeable battery.

According to a first advantageous embodiment of the invention, a particularly reliable filling of the cell with the electrolyte is achieved in that the at least one outlet has at least one filler neck that can be flow-connected to the filling opening of the cell that is to be filled, while the interior of the cell is sealed so as to be pressure-tight vis-à-vis the interior of the sealing container. In particular, it can be provided that the at least one filler neck can be inserted into the filling opening. A filler neck that protrudes into or that can be inserted into the filling opening causes the electrolyte liquid to be conveyed directly into the interior of the cell that is to be filled and that is below the filling opening. This prevents electrolyte liquid from spilling or accidentally overflowing over the edge of the filling opening.

For purposes of sealing the interior of the cell so as to be pressure-tight vis-à-vis the interior of the sealing container, the at least one outlet or the at least one filler neck has sealing means. This can be, for instance, a sealing ring that is arranged below the outlet of the reservoir or a corresponding sealing ring that is provided on the circumference of the filler neck, thus establishing an air-tight or pressure-tight seal between the filler neck or the outlet and the filling opening of the cell. The expression "pressure-tight sealing" as set forth in the present invention refers to a seal that can withstand a pressure difference between the interior of the cell and the interior of the sealing container. The seal should be able to withstand a pressure gradient in both directions, preferably, however, at least a pressure gradient in the direction of the interior of the cell, that is to say, a state in which the pressure in the interior of the sealing container is greater than the pressure in the interior of the cell.

Advantageously, the sealing means are configured in such a way that they are chemically resistant to the aggressive electrolyte liquid, especially to sulfuric acid. Towards this end, a chemically resistant plastic, especially rubber, is preferably selected as the material for the sealing means, for instance, ethylene-propylene-diene rubber or a fluoroelastomeric material. An example of a conceivable sealing means is an O-ring made of ethylene-propylene-diene rubber that is arranged on the circumference of the filler neck or in the area of the outlet, and that creates a pressure-tight seal for any gap that might exist between the filling opening and the outlet or the filler neck.

According to another advantageous embodiment of the invention, the at least one reservoir is configured as a cuboidal, cylindrical, conical or funnel-shaped flask that is open towards the top and that has at least one outlet in its bottom. The production of cuboidal or cylindrical flasks is technically simple, for instance, they can be made of sheet metal or plastic. Conical or funnel-shaped flasks also entail the advantage that, due to their funneling effect, virtually all of the electrolyte liquid flows via the outlet into the interior of the cell, particularly if the outlet is arranged in the tapered area of a flask configured in this manner and if the flask is arranged with its tapered area or outlet facing downwards in the filling apparatus in the gravitational-pull direction. A reservoir configured so as to be open towards the top easily allows the space of the filled reservoir above the level of the electrolyte liquid to be in a state of pressure balance with the interior of the sealing container.

Since many rechargeable batteries, especially those for the automotive sector, have several cells, according to another advantageous embodiment of the invention, it can be provided for the filling apparatus to have several reservoirs, each having at least one outlet or an outlet with at least one filler neck.

In particular, it can also be provided for the number and/or the arrangement of all of the outlets or filler necks of the filling apparatus to match the number and/or the arrangement of the filling openings of the rechargeable battery. This allows all of the cells of the rechargeable battery to be filled simultaneously in one filling procedure by means of the device according to the invention. In this context, a reservoir can be provided from which a number of outlets and/or filler necks branch off that match the number of cells of the rechargeable battery. Alternatively, it can be provided for the number of reservoirs having outlet and filler necks to match the number and arrangement of the filling openings of the rechargeable battery, so that the arrangement of the outlets or filler necks preferably corresponds to the arrangement of the filling openings of the rechargeable battery. A corresponding arrangement of the filler necks or outlets allows a particularly simple establishment of the flow-connection of the outlets or filler necks to the filling openings of the rechargeable battery. Preferably, the filling opening is simply placed onto or inserted into the opened filling apparatus from the top. This can be done manually or automatically.

According to another advantageous embodiment of the invention, the evacuatable sealing container has a baseplate and a removable, preferably hood-shaped top part that is sealed against it so as to be pressure-tight. Preferably, the removable top part can be lowered or drawn over the rechargeable battery and/or over the filling apparatus by means of a lifting mechanism.

In order to place a rechargeable battery into the filling device, the top part of the sealing container is raised or lowered, preferably by means of the lifting mechanism, and, once the rechargeable battery has been put in place, it is lowered again to the baseplate, so that the top part and the baseplate seal against each other so as to be pressure-tight. The pressure-tight seal can be achieved, for instance, with sealing means, especially with rubber gaskets, on the underside of the top part that comes into contact with the baseplate.

In an advantageous manner, the sealing container according to another embodiment of the invention has a shape that is essentially adapted to that of the rechargeable battery. Advantageously, the container is configured as a cuboidal housing consisting of a hood-shaped top part and a flat baseplate that is only slightly larger than the rechargeable battery itself but that still has enough space to accommodate the filling apparatus. By keeping the internal volume of the sealing container as small as possible, it is achieved that the interior of the sealing container can be evacuated very quickly, as a result of which the duration of a filling procedure can be reduced. Moreover, the sealing container offers splash protection for the operator of the filling apparatus since the rechargeable battery is hermetically enclosed by the sealing container during the filling procedure.

According to another advantageous embodiment of the invention, at least parts of the filling apparatus, especially the at least one filler neck and/or the at least one reservoir, are secured to the top part of the sealing container. In particular, this achieves that, when the top part is raised, the filling apparatus is automatically also lifted upwards, so that after being filled, the rechargeable battery can easily be removed from the entire filling device right away, without the filling apparatus having to be separated from the filled rechargeable battery in an additional work step. Conversely, when the top part is lowered, the filling apparatus is automatically inserted into the filling openings of the rechargeable battery that is to be filled.

Especially advantageously, the filling apparatus or at least parts thereof are resiliently held on the top part of the sealing container, for instance, by means of spring-loaded holding bars or by a spring-loaded suspension that gives away when the filling apparatus is placed onto the rechargeable battery, provided that the top part has not yet reached its final closing position on the baseplate during the lowering operation. Such a resilient fastening of at least parts of the filling apparatus on the top part of the sealing container makes it possible to compensate for height differences resulting from tolerances in the dimensions of the rechargeable battery.

In order to achieve a simple, positionally precise, especially automatic establishment of the flow-connection of the outlets(s) or filler neck(s) to the filling opening(s) of the rechargeable battery, according to another advantageous embodiment of the invention, the filling apparatus has mechanical guide means, especially adjustment bolts. As a result, when the filling apparatus is put in place during the lowering of the top part with the filling apparatus held on it, the rechargeable battery is automatically pushed into the correct position relative to the filling apparatus, so that the outlets or filler necks automatically engage with the filling openings of the rechargeable battery or are flow-connected to them.

According to another advantageous embodiment of the invention, the device has a vacuum unit to evacuate the interior of the sealing container and/or a pressure source to generate atmospheric pressure or a pressure that is above atmospheric pressure in the interior of the sealing container. Especially preferably, vacuum pumps or pressure pumps are used for this purpose.

In order to control and influence the filling procedure, according to another advantageous embodiment of the invention, it can be provided that the pressure in the interior of the sealing container can be controlled and/or regulated by means of the pressure source or the vacuum unit. In particular, it can be provided that the pressure in the interior of the sealing container can be controlled and/or regulated within the range from 10 mbar to 2,500 mbar, preferably within the range from 100 mbar to atmospheric pressure. Among other things, this makes it possible to set pressure profiles that are defined by the user when the rechargeable battery is being filled.

A first independent idea of the invention relates to a filling apparatus of the type described above that is suitable to be arranged in a sealing container or in a device according to the invention in order to fill at least one cell of a rechargeable battery with electrolyte liquid. In particular, it is conceivable for the filling apparatus to constitute an autonomous unit that especially can be integrated as a retrofit set or accessory into existing filling devices.

Another independent idea of the invention relates to a method for filling at least one cell of a rechargeable battery with electrolyte liquid in the interior of a sealing container, especially to a method using the device described above in order to fill a rechargeable battery. According to this embodiment of the invention, the filling method is characterized by the following steps:

a) the interior of the cell is evacuated via a filling opening of the cell that is to be filled, which is done by generating a negative pressure in the interior of the sealing container;

b) at least one reservoir arranged in the interior of the sealing container is filled with electrolyte liquid so that the reservoir above the level of the electrolyte liquid is in a state of pressure balance with the interior of the sealing container;

c) the pressure is increased in the interior of the sealing container so that, owing to the pressure difference between the interior of the sealing container and the interior of the cell, electrolyte liquid is conveyed out of the reservoir and into the cell via at least one outlet, so that, prior to the filling procedure, the reservoir is flow-connected to the filling opening of the cell, while the interior of the cell is sealed so as to be pressure-tight vis-à-vis the interior of the sealing container.

According to this embodiment of the invention, the generation of such a pressure difference between the interior of the sealing container and the interior of the cell causes a pressure to be exerted onto the level of the electrolyte liquid that markedly improves and accelerates the penetration of electrolyte liquid into the set of electrodes inside the cell.

Moreover, since the interior of the cell is sealed so as to be pressure-tight vis-à-vis the interior of the sealing container by means of the outlet, it is ruled out that the outside of the cell or of the rechargeable battery can come into contact with electrolyte liquid in any way whatsoever. This eliminates the need for the laborious task of cleaning electrolyte liquid adhering to the outside of the rechargeable battery.

According to a first advantageous embodiment of the method, this process can be improved in that the pressure in the interior of the sealing container is increased to atmospheric pressure or even to a level that is above atmospheric pressure.

According to another advantageous embodiment of the invention, it is likewise conceivable for the pressure in the interior of the sealing container to be gradually increased, especially first to atmospheric pressure and subsequently to a level that is above atmospheric pressure.

Moreover, it can be advantageously provided that, while the pressure is being increased in the sealing container, it can be varied, especially in a pulsating manner, between two values, especially between atmospheric pressure and a pressure that is above atmospheric pressure.

In order to improve the efficiency, it can also be provided that the two method steps described above are repeated several times in order to convey as much electrolyte liquid as possible into the interior of the cells.

Additional objectives, features and advantageous application possibilities of the invention ensue from the description below of an embodiment making reference to the drawings. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown.

DETAILED DESCRIPTION OF THE INVENTION

Figure 1:
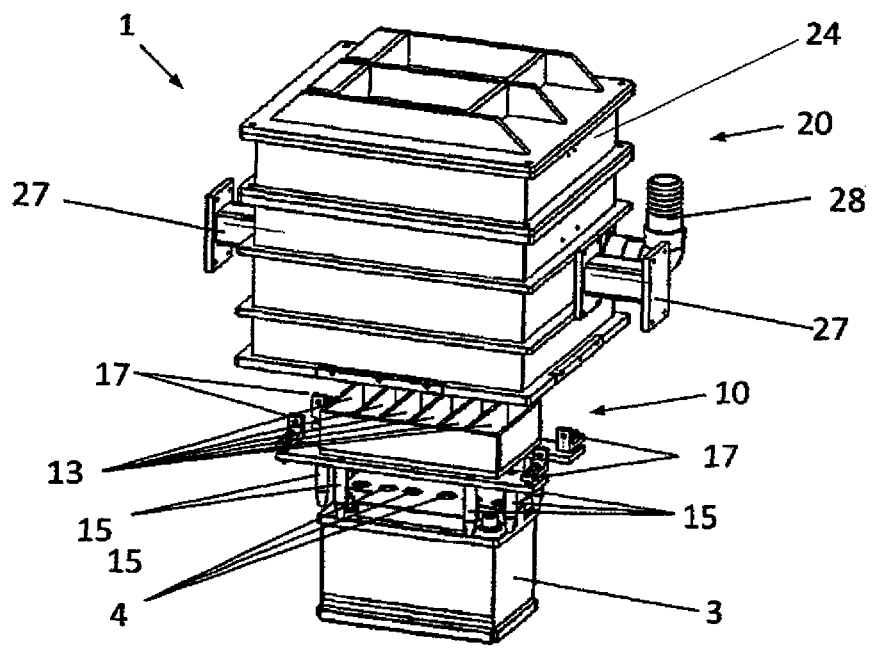
FIG. 1 a possible embodiment of a device according to the invention, for filling at least one cell of a rechargeable battery with electrolyte liquid, in an exploded view, without the baseplate.

FIGS. 1 to 4 show a possible embodiment of a device 1 according to the invention, for filling at least one cell 2 of a rechargeable battery 3 with electrolyte liquid 30. The device 1 has a filling apparatus 10, a sealing container 20 to accommodate the filling apparatus 10 and the rechargeable battery 3 as well as a feed means 11 that passes through the container wall 21 and that serves to supply to the filling apparatus 10 with electrolyte liquid 30. In the embodiment shown here, the essentially cuboidal sealing container 20 consists of a flat baseplate 23 and a hood-shaped top part 24.

The top part 24 can be removed from the baseplate 23, that is to say, raised or lowered by means of a lifting mechanism (not shown here). For this purpose, the top part 24 is joined to the lifting mechanism (not shown here) by means of the fastening arms 27.

Moreover, the removable top part 24 is configured in such a way that, when it is placed on the baseplate 23, it seals the latter pressure-tight, so as to withstand a pressure difference between the interior 22 of the sealing container 20 and its surroundings. In order to seal off the top part 24 on the baseplate 23, the top part 24 has a bottom sealing element 29, especially an encircling rubber gasket, on its underside facing the baseplate 23. This makes it possible to evacuate the sealing container 20 according to the invention, that is to say, to create a vacuum in its interior 22. For purposes of evacuating the sealing container 20, that is to say, in order to generate a vacuum, there is a vacuum unit (likewise not shown here), especially a vacuum pump, which can be connected to the interior 22 of the sealing container 20 via a pump connection 28 on the sealing container 20. According to FIGS. 1 to 3, the pump connection 28 in the present embodiment is configured as an angled pipe piece with a connection thread and it is arranged laterally on the top part 24 of the sealing container 20.

Moreover, in the present embodiment, the sealing container 20 has a shape that is essentially adapted to that of the rechargeable battery 3. The baseplate 23 and the top part 24 form a cuboidal housing that is only slightly larger than the rechargeable battery 3 itself but that still leaves enough space to likewise also accommodate the filling apparatus 10.

According to the invention, the filling apparatus 10 has at least one reservoir 13. In the present embodiment, the filling apparatus 10 has a total of six reservoirs 13, matching the number of cells 2 of the rechargeable battery 3. These reservoirs 13 can each be filled separately with electrolyte liquid 30 via the feed means 11 of the filling apparatus 10. Preferably, the holding capacity of each sealing container 13 is selected in such a way that it can hold at least as much electrolyte liquid 30 as is necessary to properly fill the associated cell 2. In particular, it is conceivable for the amount of electrolyte that is to be introduced into each reservoir 13 to be metered in via the feed means 11.

Figure 2:
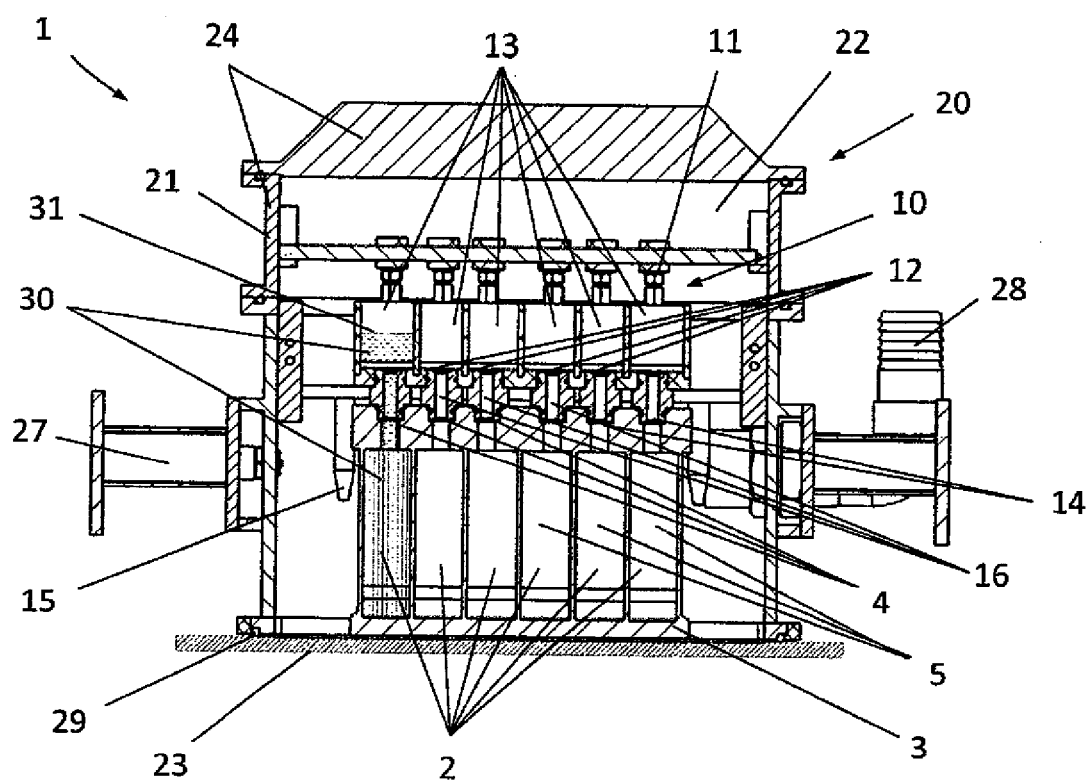
FIG. 2 a sectional view through the device according to FIG. 1, with the baseplate.
Figure 3:
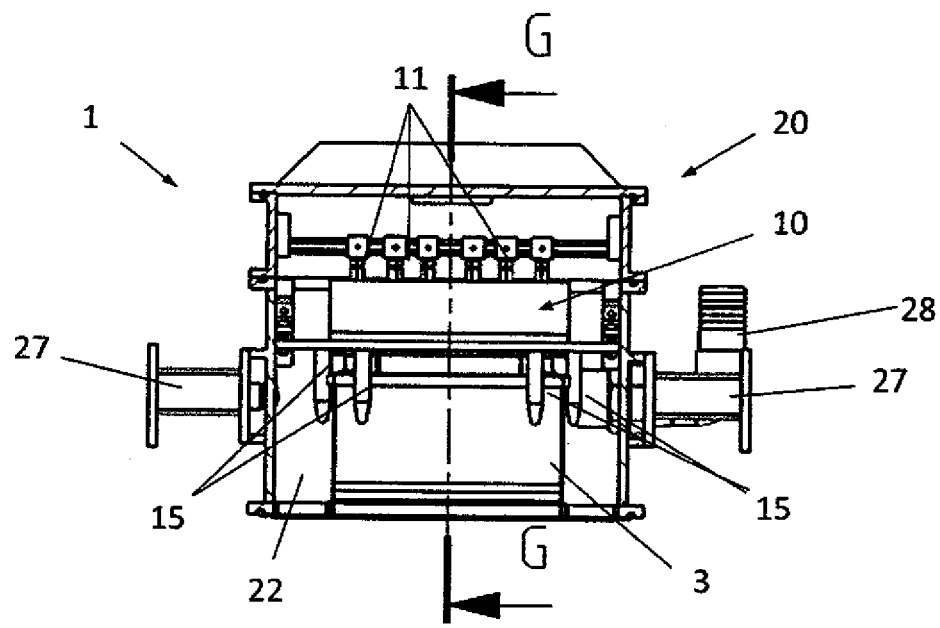
FIG. 3 another sectional view through the device according to FIG. 1, without the baseplate.
Figure 4:
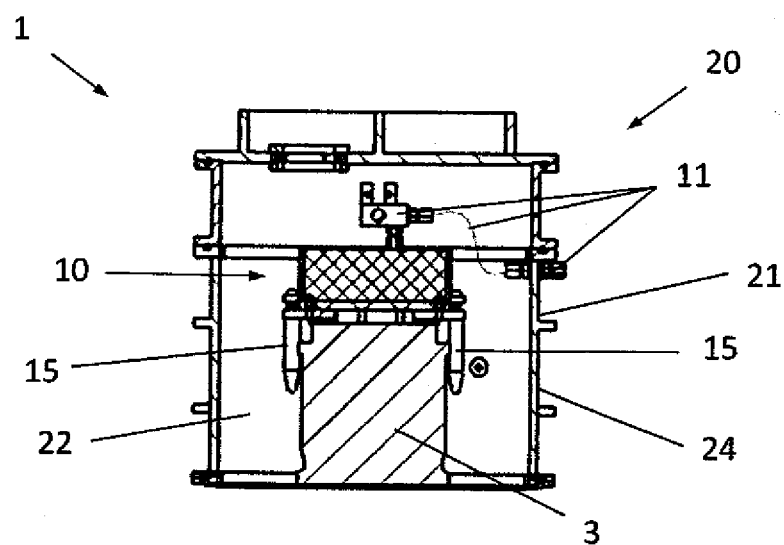
FIG. 4 a sectional view through the device according to FIG. 3, along the sectional line G-G, without the baseplate.

Each of the reservoirs 13 is configured in such a manner that it is in a state of pressure balance with the interior 22 of the sealing container 20 when filled above the level 31 of the electrolyte liquid and which, by means of at least one outlet 12 located below the level 31 of the electrolyte liquid, can be flow-connected to a filling opening 4 of the cell 2 that is to be filled, while the interior 5 of the cell 2 is sealed so as to be pressure-tight vis-à-vis the interior 22 of the sealing container 20. FIG. 2 shows the filling apparatus 10 in its filling position, that is to say, in a position in which, each reservoir 13 is flow-connected by means of its outlet 4 to an associated cell interior 5, while the interior 5 of the cell 2 is sealed so as to be pressure-tight vis-à-vis the interior 22 of the sealing container 20. In this manner, a pressure difference can be built up between the interior 5 of the cell 2 and the interior 22 of the sealing container 20 when the reservoir 13 has been filled with electrolyte liquid 30.

In the embodiment shown here of the device 1 according to the invention, each outlet 12 of each reservoir 13 has a filler neck 16 that is or can be inserted into the filling opening 4, while the interior 5 of the cell 2 is sealed so as to be pressure-tight vis-à-vis the interior 22 of the sealing container 20.

In order to create a pressure-tight seal, the filler neck 16 has a sealing means 14, especially a sealing ring arranged on the circumference of the filler neck 16. This sealing ring seals off the gap between the filling opening 4 and the filler neck 16 that engages with it with a certain amount of play. Preferably, the sealing ring is made of a material, for instance, ethylene-propylene-diene rubber or a fluoroelastomeric material, that is chemically resistant to the aggressive electrolyte liquid 30, especially to sulfuric acid.

The arrangement of the outlets 12—or of the adjoining filler necks 16—of the filling apparatus 10 matches the arrangement of the filling opening 4 of the rechargeable battery 3, so that the filler necks 16 automatically engage with the filling openings 4 of the rechargeable battery 3 when the filling apparatus 10 is placed onto the rechargeable battery 3.

In order to align the rechargeable battery 3 when the filling apparatus 10 is put in place or when the filler necks 16 are inserted into the filling openings 4, the filling apparatus 10 has mechanical guide means 15, especially adjustment bolts, that automatically push the rechargeable battery 3 into the correct position when the filling apparatus 10 is put in place.

The placement of the filling apparatus 10 can be carried out either manually or automatically. In the embodiment shown here, the filling apparatus 10, especially the reservoir 13 with the filler necks 16, is held by a holding means 17 on the top part 24 of the sealing container 20, so that the filling apparatus 10 automatically follows when the top part 24 is raised or lowered. This advantageously achieves that, when the filling device 1 is being fitted with a new rechargeable battery 3 or when a filled rechargeable battery 3 is being removed, the filling apparatus 10 is automatically lifted off from or placed onto the rechargeable battery 10 when the sealing container 20 is opened or closed.

In order to compensate for any tolerances in the dimensions of the rechargeable battery 3, the filling apparatus 10 is held resiliently on the top part 24 of the sealing container 20, here by means of a spring-loaded holding bolt of the holding means 17.

In order to fill a rechargeable battery 3 with electrolyte liquid 30, the top part 24 is raised together with the filling apparatus 10 upwards from the baseplate 23 by means of a lifting mechanism (not shown here). Then the rechargeable battery 3 that is to be filled is positioned on the baseplate 23 of the sealing container 20 and subsequently the top part 24, together with the filling apparatus 10, is lowered in a vertical movement downwards, so that, after traversing a given distance, the positioning bolt—as the guide means 15—engages with the housing of the rechargeable battery 3 and pushes it into the desired position, so that the filler necks 16 of the filling apparatus 10 automatically engage with the opened filling openings 4 of the rechargeable battery 3. Any conceivable height differences resulting from tolerances in the dimensions of the rechargeable battery 3 are compensated for by the resilient mounting of the filling apparatus 10 in the top part 24 of the sealing container 20.

Before the actual filling procedure, first of all, the interior 22 of the sealing container 20 is evacuated through the pump connection 28 by means of the vacuum unit (not shown here). Since, at this point in time, no electrolyte liquid 30 is present in the reservoirs 13, the interior 5 of the cells 2 is flow-connected to the interior 22 of the sealing container 20, so that the interior 5 of the cells 2 is evacuated at the same time. Once the desired negative pressure has been reached in the interior of the cells or of the sealing container 20, electrolyte liquid 30 is then filled into the reservoirs 13 via the feed means 11. For this purpose, the feed means 11 passes through the container wall 21 so as to be pressure-tight.

The filling of the reservoir 13 with electrolyte liquid 30 is done in such a way that, after being filled above the level 31 of the electrolyte liquid, each reservoir 13 is in a state of pressure balance with the interior of the sealing container 20. Then, via the outlets 12 located below the level 31 of the electrolyte liquid, electrolyte liquid 30 can flow through the filler necks 16 into the cells 2 of the rechargeable battery 3. In order to improve or accelerate the filling procedure, the pressure in the interior 22 of the sealing container 20 is increased after or already during the filling of the reservoirs 13. Since the outlet 12 or the filler necks 16 rest on the openings 4 of the cells 2 of the rechargeable battery 3 so as to be pressure-tight, a pressure difference can build up between the interior 5 of the cells 2 and the interior 22 of the sealing container 20.

Altogether, this achieves that the level 31 of the electrolyte liquid is exposed to a pressure that accelerates and improves the penetration of the electrolyte liquid 30 into the set of electrodes 6 of the cells 2; in particular, it improves the penetration in such a way that the set of electrodes fills up with electrolyte liquid 30 with the greatest saturation possible and no air pockets are present. For this purpose, the pressure is preferably increased to atmospheric pressure in that, for instance, the vacuum pump is switched off and the interior 22 of the sealing container 20 is vented.

In order to further accelerate or improve the filling procedure, the pressure in the interior 22 of the sealing container 20 is additionally increased to a level that is above atmospheric pressure. In particular, the pressure in the interior 22 of the sealing container 20 can be gradually increased, preferably first to atmospheric pressure and subsequently to a level that is above atmospheric pressure.

It is likewise conceivable that, while the pressure is being increased in the interior 22 of the sealing container 20, it can be varied, especially in a pulsating manner, between two values, especially between atmospheric pressure and a pressure that is above atmospheric pressure.

It is likewise conceivable that, in order to enhance the efficiency, the method steps of evacuation, filling of the reservoir 13 and increasing the pressure are repeated several times.

In order to increase the pressure to a level that is above atmospheric pressure, the device advantageously has a pressure source (not shown here), especially a pressure pump.

According to an advantageous embodiment of the invention, the pressure in the interior 22 of the sealing container 20 can be controlled and/or regulated by means of the pressure source and/or the vacuum unit. Preferably, the control or regulation takes place within the range from 10 mbar to 2,500 mbar, especially within the range from 100 mbar to atmospheric pressure.

Once the filling procedure has been completed, the sealing container 20 is vented and the top part 24 is lifted off the baseplate 23 by means of the lifting mechanism, so that the filling apparatus 10, especially the filler necks 16, are automatically removed from the filling openings 4.

LIST OF REFERENCE NUMERALS 1 filling device
2 cell of the rechargeable battery
3 rechargeable battery
4 filling opening
5 interior of the cell 6 set of electrodes
10 filling apparatus
11 feed means
12 outlet
13 reservoir
14 sealing means
15 guide means
16 filler neck
17 holding means
20 sealing container
21 container wall
22 interior of the sealing container
23 baseplate
24 top part
27 fastening arm
28 pump connection
29 bottom sealing elements
30 electrolyte liquid
31 level of the electrolyte liquid

The invention claimed is:

1. A device (1) for filling at least one cell (2) of a rechargeable battery (3) with electrolyte liquid (30), comprising:
 a filling apparatus (10) having at least one reservoir (13) that can be filled with electrolyte liquid (30);
 an evacuatable sealing container (20) having an interior (22) to accommodate the filling apparatus (10) and the rechargeable battery (3), wherein the at least one reservoir (13), or at least one filler neck (16) thereof, is resiliently held at a top part (24) of the sealing container (20);
 a feed means (11) that passes through the container wall (21) to supply the filling apparatus (10) with electrolyte liquid (30), said feed means having at least one outlet (12) that has the at least one filler neck (16), wherein the at least one reservoir (13) is in a state of pressure balance with the interior of the sealing container (20) when filled above a level (31) of the electrolyte liquid and which, via the at least one outlet (12) located below the level (31) of the electrolyte liquid, is flow-connected to a filling opening (4) of the cell (2) that is to be filled, while an interior (5) of the cell (2) is sealed so as to be pressure-tight vis-à-vis the interior (22) of the sealing container (20); and
 mechanical guide means (15) associated with the filling apparatus (10) to establish position for flow-connection of the filler neck (16) to the filling opening (4) of the rechargeable battery (3).

2. The device according to claim 1, wherein the at least one filler neck (16) is adapted to be flow-connected to the filling opening (4) of the cell (2) that is to be filled, while the interior (5) of the cell (2) is sealed so as to be pressure-tight vis-à-vis the interior (22) of the sealing container (20).

3. The device according to claim 1 wherein the at least one outlet (12) or the at least one filler neck (16) has sealing means (14) to seal the interior (5) of the cell (2) vis-à-vis the interior (22) of the sealing container (20) so as to be pressure-tight.

4. The device according to claim 1, wherein the at least one reservoir (13) is configured as a flask that is open towards the top and that has at least one outlet (12) in its bottom (14), wherein the flask is a shape selected from the group consisting of cuboidal, cylindrical, conical and funnel.

5. The device according to claim 1, wherein the filling apparatus (10) has several reservoirs (13), with each reservoir (13) having at least one outlet (12) with a filler neck (16).

6. The device according to claim 1, wherein the number and arrangement of filler necks (16) of the filling apparatus (10) match the number and arrangement of the filling openings (4) of the rechargeable battery (3).

7. The device according to claim 1, further comprising either a vacuum unit for generating a vacuum in the interior (22) of the sealing container (20), or a pressure source for generating a pressure that is above atmospheric pressure in the interior (22) of the sealing container (20).

8. The device according to claim 7, wherein the pressure in the interior (22) of the sealing container (20) is maintained within the range from 10 mbar to 2,500 mbar.

9. The device according to claim 1, wherein the sealing container further comprises a baseplate (23) and a removable top part (24) that is adapted to be sealed for a pressure-tight fit.

10. A method for filling at least one cell (2) of a rechargeable battery (3) with electrolyte liquid (30) comprising:
 a) first, placing the rechargeable battery (3) or the at least one cell (2) thereof into an interior (22) of a sealing container (20);
 b) second, evacuating an interior (5) of the cell (2) via a filling opening (4) of the cell (2) that is to be filled by generating a negative pressure in the interior (22) of the sealing container (20);
 c) third, flow-connecting at least one reservoir (13) arranged in the interior (22) of the sealing container (20) to the filling opening (4) of the cell (2), while the interior (5) of the cell (2) is sealed so as to be pressure-tight vis-à-vis the interior (22) of the sealing container (20);
 d) fourth, filling the at least one reservoir (13) with electrolyte liquid (30) so that the reservoir (13) above the electrolyte liquid level (31) is in a state of pressure balance with the interior (22) of the sealing container (20); and
 e) fifth, increasing the pressure in the interior (22) of the sealing container (20) so that, owing to the pressure difference between the interior (22) of the sealing container (20) and the interior (5) of the cell (2), electrolyte liquid (30) is conveyed out of the reservoir (13) and into the cell (2) via at least one outlet (12).

11. The method according to claim 10, wherein the pressure in the interior (22) of the sealing container (20) is increased to atmospheric pressure or to a level that is above atmospheric pressure.

12. The method according to claim 10, wherein the pressure in the interior (22) of the sealing container (20) is gradually increased first to atmospheric pressure and subsequently to a level that is above atmospheric pressure.

13. The method according to claim 10, wherein while the pressure is being increased in the interior (22) of the sealing container (20), it is varied between two values.

14. The method according to claim 10, wherein the method steps b. to e. are repeated several times.

15. A device for filling at least one cell of a rechargeable battery with electrolyte liquid, comprising:
 a filling apparatus having at least one reservoir adapted to receive electrolyte liquid;
 an evacuatable sealing container having an interior to accommodate the filling apparatus and the rechargeable battery, wherein the at least one reservoir, or at least one filler neck thereof, is resiliently held at a top part of the sealing container;
 a feed passage that passes through the container wall to supply the filling apparatus with electrolyte liquid, said feed passage having at least one outlet that has the at least one filler neck, wherein the at least one reservoir is in a state of pressure balance with the interior of the sealing container when filled above a level of the electrolyte liquid and which, via the at least one outlet located below the level of the electrolyte liquid, is flow-connected to a filling opening of the cell that is to be filled, while an interior of the cell is sealed so as to be pressure-tight vis-à-vis the interior of the sealing container; and an adjustment bolt associated with the filling apparatus to establish position for flow-connection of the filler neck to the filling opening of the rechargeable battery.

\* \* \* \* \*